United States Patent
Tanaka et al.

[11] 3,899,582
[45] Aug. 12, 1975

[54] AROMATIC IMIDOCARBONATE COMPOSITION AND METHOD OF USE FOR COMBATTING FUNGI

[75] Inventors: Shizuya Tanaka, Minoo; Toshiaki Ozaki; Akihiko Mine, both of Toyonaka; Katsutoshi Tanaka, Takarazuka; Sigeo Yamamoto, Toyonaka; Tadashi Ooishi, Takarazuka; Naganori Hino, Toyonaka; Takeo Satomi, Takarazuka, all of Japan

[73] Assignee: Sumitomo Chemical Company, Limited, Osaka, Japan

[22] Filed: Jan. 31, 1974

[21] Appl. No.: 438,425

Related U.S. Application Data

[60] Division of Ser. No. 238,537, March 27, 1972, Pat. No. 3,832,351, which is a continuation-in-part of Ser. No. 133,744, April 13, 1971, abandoned.

[30] Foreign Application Priority Data

Apr. 21, 1970 Japan................................ 45-34457
Nov. 22, 1971 Japan................................ 46-93874

[52] U.S. Cl. ................. 424/263; 424/266; 424/301
[51] Int. Cl................................................ A01n 9/22
[58] Field of Search .................................... 424/263

[56] References Cited
OTHER PUBLICATIONS

Haubein et al., J. Agr. Food Chem., Vol. 3, No. 6, pp. 555–557, Nov.–Dec. (1965).
Ernst et al., Tetrahedron Letters, Pergamon Press, London, pp. 3023–3025.

*Primary Examiner*—Jerome D. Goldberg
*Assistant Examiner*—Allen J. Robinson
*Attorney, Agent, or Firm*—Stevens, Davis, Miller & Mosher

[57] ABSTRACT

Novel imidocarbonate derivatives having the formula:

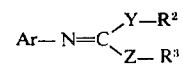

wherein Y and Z, which may be the same or different, are individually an oxygen or sulfur atom; Ar is an unsubstituted or a halogen- or lower $C_1 - C_4$ alkyl (straight or branched)-substituted benzene or pyridine nucleus, the number of the substituents being 1 to 3; $R^2$ is a $C_1 - C_{18}$ alkyl (straight or branched), a $C_1 - C_{18}$ alkyl(straight or branched) having 1 to 3 hydroxy radicals or 1 to 3 alkoxycarbonyl (the alkoxy has 1 to 4 carbon atoms) radicals in the carbon chain, a $C_3 - C_{10}$ cycloalkyl, a $C_2 - C_5$ alkenyl (straight or branched), a $C_3 - C_6$ alkynyl (straight or branched), a phenylalkyl, the benzene nucleus of which may be unsubstituted or substituted by 1 to 4 halogen atoms, 1 to 4 lower $C_1 - C_4$ alkyl (straight or branched) radicals or a nitro radical, or a halogen- or lower $C_1 - C_4$ alkyl (straight or branched)-substituted phenoxyalkyl; $R^3$ is a $C_1 - C_{18}$ alkyl (straight or branched) having 1 to 3 hydroxy radicals or 1 to 3 alkoxycarbonyl (the alkoxy has 1 to 4 carbon atoms) radicals in the carbon chain, a $C_2 - C_5$ alkenyl (straight or branched), a $C_3 - C_6$ alkynyl (straight or branched) or a phenylalkyl, the benzene nucleus of which may be unsubstituted or substituted by 1 to 4 halogen atoms, 1 to 4 lower $C_1 - C_4$ alkyl (straight or branched) radicals, a nitro radical or a $C_2 - C_4$ alkylene radical, provided that in case Ar is an unsubstituted or substituted benzene nucleus and $R^2$ and $R^3$ are phenylalkyl groups, the benzene nucleus of at least one of said phenylalkyl groups has a substituent, have strong microbicidal activities on a wide scope of microorganisms.

4 Claims, No Drawings

AROMATIC IMIDOCARBONATE COMPOSITION AND METHOD OF USE FOR COMBATTING FUNGI

CROSS-REFERENCES TO OTHER APPLICATIONS

This application is a division of application Ser. No. 238,537 filed Mar. 27, 1972, now U.S. Pat. No. 3,832,351 which is a continuation-in-part of application Ser. No. 133,744 filed Apr. 13, 1971, now abandoned.

The present invention relates to novel imidocarbonate derivatives, process for preparing said compounds and non-medical microbicides containing said compounds as active ingredients.

In accordance with the present invention, there are provided novel imidocarbonate derivatives represented by the formula (I):

(I)

wherein Y and Z, which may be the same or different, are individually an oxygen or sulfur atom; Ar is an unsubstituted or halogen- or lower $C_1 - C_4$ alkyl (stragith or branched)-substituted benzene nucleus or an unsubstituted or halogen- or lower $C_1 - C_4$ alkyl (straight or branched)-substituted pyridine nucleus, the number of the substituents being 1 to 3; $R^2$ is a $C_1 - C_{18}$ alkyl (straight or branched), a $C_1 - C_{18}$ alkyl (straight or branched) having 1 to 3 hydroxy radicals or 1 to 3 alkoxycarbonyl (the alkoxy has 1 to 4 carbon atoms) radicals in the carbon chain, a $C_3-C_{10}$ cycloalkyl, a $C_2 - C_5$ alkenyl (straight or branched), a $C_3 - C_6$ alkynyl (straight or branched), a phenylalkyl, the benzene nucleus of which may be unsubstituted or substituted by 1 to 4 halogen atoms, 1 to 4 lower $C_1-C_4$ alkyl (straight or branched) radicals or a nitro radical, or a halogen- or lower $C_1 - C_4$ alkyl (straight or branched)-substituted phenoxyalkyl; $R^3$ is a $C_1 - C_{18}$ alkyl (straight or branched) having 1 to 3 hydroxy radicals or 1 to 3 alkoxycarbonyl (the alkoxy has 1 to 4 carbon atoms) radicals in the carbon chain, a $C_2 - C_5$ alkenyl (straight or branched), a $C_3 - C_6$ alkynyl (straight or branched) or a phenylalkyl, the benzene nucleus of which may be unsubstituted or substituted by 1 to 4 halogen atoms, 1 to 4 lower $C_1 - C_4$ alkyl (straight or branched) radicals, a nitro radical or $C_2 - C_4$ alkylene radical, provided that in case Ar is an unsubstituted or substituted benzene nucleus and $R^2$ and $R^3$ are phenylalkyl groups, the benzene nucleus of at least one of said phenylalkyl groups has a substituent; processes for preparing said compounds; and non-medical microbicides containing said compounds as active ingredients.

A preferred imidocarbonate derivative is represented by the formula:

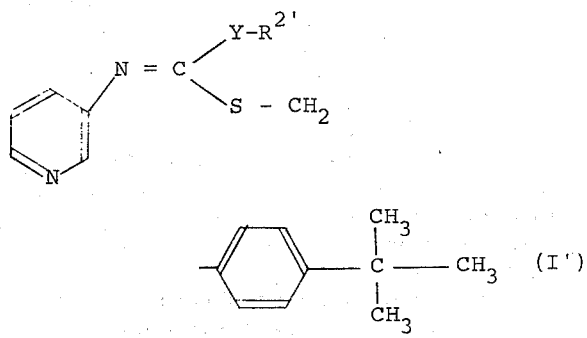
(I')

wherein Y is the same as defined above and $R^{2'}$ is a $C_1 - C_8$ alkyl (straight or branched), a $C_3 - C_6$ cycloalkyl or a lower $C_1 - C_4$ alkyl (straight or branched)-substituted benzyl radical.

In the definitions of Ar, $R^2$, $R^2$ and $R^3$, examples of the lower alkyl are preferably methyl, ethyl, propyl, isopropyl, isobutyl, n-butyl, t-butyl, etc.; examples of the alkenyl are vinyl, allyl, crotyl, butenyl, etc.; examples of the alkynyl are preferably propagyl, etc.; examples of phenylalkyl are preferably benzyl, phenetyl, α-methyl benzyl, phenylpropyl, etc.; examples of the halogen are chlorine, bromine, fluorine and iodine, examples of the alkoxycarbonyl are preferably methoxycarbonyl, ethoxycarbonyl, propoxycarbonyl, etc.; and examples of the cycloalkyl are preferably cyclopropyl, cyclobutyl, cyclopentyl, cyclohexyl, methylcyclopentyl, etc.

The above-mentioned imidocarbonate derivatives are synthesized by the following processes:

Synthesis process (A)

A thionocarbamic or dithiocarbamic acid ester derivative represented by the general formula (II):

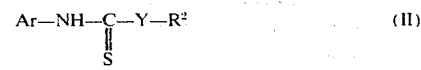
(II)

wherein Ar, $R^2$ and Y are the same as defined above, is reacted with an organic halide represented by the general formula (III):

$$R^3 - X$$
(III)

wherein $R^3$ is the same as defined above; and X is a halogen atom.

Synthesis process (B)

An isocyanic acid dichloride derivative represented by the general formula (IV):

(IV)

wherein Ar is the same as defined above, is reacted with an alkali metal alcoholate or mercaptide derivative represented by the general formula (V):

$$R^2 - Y - M$$
(V)

wherein $R^2$ and Y are the same as defined above; and M is an alkali metal atom.

Synthesis process (C)

An imidocarbonate chloride derivative represented by the general formula (VI):

(VI)

wherein Ar and $R^2$ are the same as defined above, is reacted with an alkali metal alcoholate or mercaptide derivative represented by the general formula (VII):

$$R^3 - Z - M \qquad \text{(VII)}$$

wherein $R^3$, Z and M are the same as defined above.

Synthesis process (D)

A dialkali metal imidodithiocarbonate derivative represented by the general formula (VIII):

$$\text{(VIII)}$$

wherein Ar and M are the same as defined above, is reacted with an organic halide represented by the general formula (IX):

$$R^2 - X \qquad \text{(IX)}$$

wherein $R^2$ and X are the same as defined above.

Several imidocarbonate, imidomonothiocarbonate and imidodithiocarbonate derivatives have been well known hitherto. However, all the compounds of the present invention are novel, and the present inventors have found, as the result of extensive studies, that these compounds have strong microbicidal effects on an extremely wide scope of microorganisms. They have prominent effects on such a wide scope of microorganisms as rice blast (*Pyricularia oryzae*), helminthosporium leaf spot (*Cochliobolus miyabeanus*), sheath blight (*Pellicularia sasakii*), bacterial leaf blight (*Xanthomonas oryzae*), and the like pathogens of rice plants, and sclerotinia rot (*Sclerotinia sclerotiorum*), brown rot (*Sclerotinia fructigena*), gray mold (*Botrytis cinerea*), cork spot (*Alternaria mali*), blossom blight (*Sclerotinia mali*), powdery mildew (*Erysiphe cichoracearum*), alternaria leaf spot (*Alternaria brassicae*), damping-off (*Pythium debaryanum*), bacterial canker (*Corynebacterium michiganense*), ripe rot (*Glomerella cingulata*), southern blight (*Corticium rolfsii*) and the like pathogens of agricultural and horticultural crops, and are markedly excellent plant disease-controlling chemicals capable of controlling two or more kinds of plant diseases at the same time. Further, the present compounds are effective for the control of molds propagating in industrial products and hence are excellent as industrial microbicides and also have herbicidal activities. Moreover, they are extremely low in toxicity and scarcely have detrimental actions on mammals and fishes.

The synthesis process (A) is carried out in such a manner that to a solution of 1 mole of the said thionocarbamic or dithiocarbamic acid ester derivative (II) in methanol, ethanol, tetrahydrofuran, dioxane, DMSO or DMF are added 1 to 2 moles of the halide (III) and 1 to 1.5 moles of a base (e.g., a hydroxide of an alkali or alkaline earth metal such as NaOH, KOH or Ca(OH)$_2$ or an alkali metal alcoholate such as NaOCH$_3$, NaOC$_2$H$_5$ or KOCH$_3$ or tertiary amines such as triethylamine, pyridine or N,N-dimethylaniline) for neutralizing the hydrohalic acid which is formed at the time of reaction, and the resulting mixture is reacted. In this case, there may be adopted either the procedure that the base is first added to the solution of carbamic acid ester derivative and then the organic halide is added, or the procedure that the organic halide is first added to the solution of carbamic acid ester derivative and then the base is added. The reaction is effected by stirring the resulting mixture at such a mild temperature condition as at 0° to 100°C for 1 to 4 hours. After completion of the reaction, the reaction mixture is poured into an excess amount of water, and the resulting crystal or oil layer is separated by filtration or by extraction with a water-immiscible organic solvent such as benzene, toluene, ethyl acetate, ether or the like.

The synthesis process (B) is carried out in such a manner that a solution or suspension of 2 to 3 moles of the alkali metal alcoholate or mercaptide derivative (V) in an alcohol such as methanol or ethanol, an ether such as ether, dioxane or tetrahydrofuran, or a hydrocarbon such as benzene or toluene is mixed with 1 mole of the isocyanic acid dichloride derivative (IV), and the resulting mixture is reacted to obtain a desired product. The reaction may be effected at any temperature within the range of −10°C to 100°C. Since the reaction is exothermic, the starting materials are ordinarily mixed at a temperature on the lower side of −10° to 40°C and the resulting mixture is maintained at said temperature for 3 to 4 hours, or maintained at 40° to 100°C for 1 to 2 hours. An alkali metal salt formed during the reaction is separated by filtration or by dissolution in water, and then the oil layer is extracted with a water-immiscible organic solvent, whereby the product can be isolated. The product may be further purified by distillation or recrystallization.

The synthesis process (C) characteristically differs from the synthesis process (B) in that 1 to 1.5 moles of the alkali metal alcoholate or mercaptide derivative (VII) per mole of the imidocarbonate chloride derivative (VI) is used to make it possible to optionally obtain, by selection of reaction reagents, a compound of the general formula (I), in which Y and Z or $R^2$ and $R^3$ are the same as or different from each other. The reaction temperature and time and the treatment, after operations, are the same as in the synthesis process (B).

The snythesis process (D) is carried out in such a manner that 1 mole of the dialkali metal imidodithiocarbonate (VIII) is reacted with 2 to 3 moles of the organic halide (IX), whereby a desired product can be obtained. The reaction solvent may be selected from the group consisting of water, alcohol, acetone, DMF, dioxane, tetrahydrofuran, etc., and a mixture thereof. It is, of course, possible to use the dialkali metal imidodithiocarbonate (VIII) in an isolated form. It is also possible that 1 mole of the starting amine, 1 mole of carbon disulfide and 2 moles of an alkali metal hydroxide are mixed in the above-mentioned reaction solvent, and the resulting mixture is reacted as it is, i.e. without isolation, with the organic halide (IX). In case a chloride, which is low in reactivity, is used as the organic halide, it is of course possible to carry out the reaction in the presence of such a catalyst as sodium bromide, potassium bromide, sodium iodide, potassium iodide, or pyridine, triethylamine or the like. The reaction may be effected at a temperature within the range of 0° to 100°C, preferably 0° to 70°C. Ordinarily, the reaction terminates within 1 to 4 hours. After the reaction, the reaction mixture is poured into water to dissolve the formed alkali metal halide, and the resulting crystal or oily substance is recovered by filtration or extraction to obtain a desired product.

In actual application, the thus obtained compounds of the present invention may be applied as they are or may be formulated into any of such preparations as granules, dusts, wettable powders and emulsifiable concentrates. It is desirable that these preparations are suitably used according to the kinds and sizes of crops and to application purposes.

In formulating these preparations, there may be used such solid carriers as talc, bentonite, clay, kaolin, diatomaceous earth, vermiculite slaked lime, etc.; such liquid carriers as benzene, alcohols, acetone, xylene, dioxane, methyl naphthalene, cyclohexanone, etc.; and such surfactants (wetting agents and emulsifiers and the like) and binders, as alkyl sulfates, alkyl sulfonates, aryl sulfonates, polyethylene glycol ethers, polyhydric alcohol esters, polyoxyethylene alkylphenyl phenol ether, ligninsulfonic acid alkali metal salt, alkylbenzenesulfonic acid alkali metal salt, polyvinyl alcohol, etc. In application, these preparations may not only be used in admixture with agricultural surface active agents such as spreaders and the like to expect the enhancement and accuracy of the effectiveness thereof, but also be used in admixture with such agricultural chemicals as fungicides, insecticides, nematocides, herbicides, etc., and with fertilizers.

The present invention is illustrated in further detail with reference to examples, but it is needless to say that the kinds of starting materials used for preparation of the present compounds, the reaction conditions, and the kinds and mixing proportions of additives for the present compounds are variable over wide scopes without being limited only to those set forth in the examples.

EXAMPLE 1

Synthesis process (A):

Synthesis of N-3,4-dichlorophenyl-O-methyl-S-p-chlorobenzylimido-thiocarbonate (Compound No. 58):

In a solution of 5.6 g (0.1 mole) of potassium hydroxide in 50 ml of methanol was dissolved at room temperature 23.6 g (0.1 mole) of N-3,4-dichlorophenyl-O-methylthionocarbamate. Into this solution was dropped at 10° to 20°C 16.1 g (0.1 mole) of p-chlorobenzyl chloride, and the resulting mixture was stirred at said temperature for 2 hours. Subsequently, the reaction mixture was poured into 300 ml of water, and an oil layer formed was extracted with ethyl acetate and washed once with water. Thereafter, the extract was dried with anhydrous sodium sulfate, and then the solvent was removed by evaporation, whereby 33.0 g of an oily substance was obtained. This oily substance was charged with 50 ml of n-hexane, and the resulting mixture was stirred at room temperature, whereby fine needle-like crystals were formed. The crystals were obtained by filtration and then dried to obtain 31.4 g of N-3,4-dichloro-O-methyl-S-p-chlorobenzylimino-thiocarbonate, yield 87 %.

EXAMPLE 2

Synthesis process (B):

Synthesis of N-2,5-dichlorophenyl-O,O'-di(α-ethoxycarbonylethyl) imidocarbonate (Compound No. 63):

Into a suspension of 30.8 g (0.22 mole) of sodium salt of ethyl α-hydroxypropionate in 300 ml of dry ether was dropped 24.3 g (0.1 mole) of 2,5-dichlorophenyl isocyanic acid dichloride with stirring and with cooling at room temperature. The resulting mixture was heated under reflux for 1 hour and then poured into 200 ml of water to dissolve sodium chloride formed. Subsequently, the ether layer was washed once with water and dried with anhydrous sodium sulfate, and then the ether was removed by distillation under reduced pressure to obtain 32.9 g of N-2,5-dichlorophenyl-0,0'-di(α-ethoxycarbonylethyl) imidocarbonate, yield 87 %.

EXAMPLE 3

Synthesis process (C):

Synthesis of N-3-pyridyl-O-butyl-S-3,4-dichlorobenzyl imidothiocarbonate (Compound No. 38):

Into a solution of 0.12 mole of sodium 3,4dichlorobenzyl mercaptide in 200 ml of methanol was dropped with stirring at 0° to 5°C over a period of 1 hour 21.2 g (0.1 mole) of N-3-pyridyl-O-butylimidocarbonate chloride, and the resulting mixture was allowed to stand at room temperature for 3 hours. Subsequently, the reaction mixture was poured into 650 ml of water, and then extracted with 200 ml of benzene. Subsequently, the benzene layer was washed once with water and dried with anhydrous magnesium sulfate, and then the benzene was removed by evaporation to obtain 30.1 g of the desired compound in an oily form.

EXAMPLE 4

Synthesis process (D):

Synthesis of N-3-pyridyl-S,S'-di-2-chlorobenzylimidodithiocarbonate (Compound No. 14):

To a solution of 11.2 g (0.2 mole) of caustic potash in a mixed solvent comprising 60 ml of ethanol and 20 ml of water was added 9.4 g (0.1 mole) of 3-aminopyridine. To the resulting mixture was added 7.6 g (0.1 mole) of carbon disulfide at 10° to 20°C with stirring over a period of 1.5 hours. After allowing to stand at room temperature for 2 hours, the mixture was cooled to 5° to 15°C, and then 35.4 g (0.22 mole) of 2-chlorobenzyl chloride was dropped into the reaction mixture over a period of 1.5 hours. Thereafter, the reaction mixture was poured into 200 ml of water, and an oil layer formed was extracted with ethyl acetate, and the extracts were washed once with water and then dried with anhydrous sodium sulfate. Subsequently, the solvent was removed by distillation under reduced pressure to obtain 35.5 g of N-3-pyridyl-S,S'-di-2-chlorobenzyl-imidodithiocarbonate, yield 85 %.

EXAMPLE 5

Synthesis of N-3-pyridyl-S-n-butyl-S'-p-t-butylbenzyl-imidodithiocarbonate (Compound No. 84):

In 100 ml of methanol was dissolved 2.3 g (0.1 mole) of metallic sodium and 31.6 g (0.1 mole) of p-t-butylbenzyl-N-3-pyridyl dithiocarbamate was then added to the resulting solution at 15°C to dissolve it in the solution. Into the thus obtained solution was dropped at 15° - 20°C 15.1 g (0.11 mole) of n-butyl bromide (n-$C_4H_9Br$). The resulting mixture was maintained at said temperature for 2 hrs. and then at 40°C for 1 hr. The resulting reaction mixture was poured into 400 ml. of iced water, and the separated oil material was extracted with 200 ml of ethyl acetate. The thus obtained ethyl acetate layer was once washed with 200 ml of water, dried with anhydrous sodium sulfate and then subjected to distillation under reduced pressure to obtain 33.1 g (yield: 89 %) of a pale yellow, oily material.

EXAMPLE 6

Synthesis of N-3-pyridyl-O-n-butyl-S-p-t-butylbenzyl-imidothiocarbonate (Compound No. 96):

In 70 ml of methanol was dissolved 4.4 g (0.11 mole) of sodium hydroxide, and 21 g (0.1 mole) of n-butyl-N-3-pyridylthionocarbamate was then dissolved therein at 20°C. To the resulting solution was added dropwise 22.7 g (0.1 mole) of t-butylbenzyl bromide at 20° – 25°C. The resulting mixture was maintained at said temperature for 1.5 hrs., after which the reaction mixture was poured into 300 ml of iced water and subjected to extraction with 200 ml of ethyl acetate. The resulting ethyl acetate layer was treated in the same manner as in Example 5 to obtain an oil, which was solidified after being allowed to stand at room temperature over night.

EXAMPLE 7

Synthesis of N-3-pyridyl-S,S'-di-p-t-butylbenzyl-imidodithiocarbonate (Compound No. 118):

To 100 ml of ethanol containing dissolved therein 5.6 g (0.1 mole) of potassium hydroxide was added 31.6 g of p-t-butylbenzyl-N-3-pyridyl dithiocarbamate, and the resulting mixture was maintained at 20°C, to which 20 g (0.11 mole) of p-t-butylbenzyl chloride was added dropwise in 30 min. The resulting mixture was maintained at 20°C for 1.5 hrs. and then poured into 200 ml of iced water. The resulting oil layer was treated in the same manner as in Example 5 to obtain 43 g of a pale yellow oily material. To this oily material was added 30 ml of n-hexane and the resulting mixture was allowed to stand in a refregerator over night to obtain 34.6 g (yield: 75 %) of a crystal having a melting point of 77° – 80°C.

EXAMPLE 8

Synthesis of N-3-pyridyl-O-4-methylcyclohexyl-S-p-t-butyl-benzylimidothiocarbonate (Compound No. 107):

In 100 ml of methanol was dissolved 5.6 g (0.1 mole) of potassium hydroxide, and 25.1 g (0.1 mole) of 4-methylcyclohexyl-N-3-pyridyl thionocarbamate was then added thereto at 15°C to obtain a uniform liquid, into which 22.7 g (0.1 mole) of p-t-butylbenzyl bromide was then dropped at 15° – 20°C. The resulting mixture was maintained at 25°C for 3 hrs., and then poured into 400 ml of iced water. The resulting separated oily material was extracted with 200 ml of ethyl acetate. The thus obtained oil layer was once washed with water, dried with anhydrous sodium sulfate and then subjected to distillation under reduced pressure to obtain 33.9 g (yield: 85.5 %) of a pale yellow oily material.

EXAMPLE 9

Synthesis of N-3-pyridyl-S-cyclohexyl-S'-p-t-butylbenzyl-imidodithiocarbonate (Compound No. 112):

At 10°C, 31.6 g (0.1 mole) of p-t-butylbenzyl-N-3-pyridyldithiocarbamate was added to a sodium methylate solution prepared by dissolving 2.3 g of metallic sodium in 100 ml of methanol, to obtain a solution. At the same temperature, 23.1 g (0.11 mole) of cyclohexyl iodide was added to said solution, and the resulting mixture was maintained at 30°C for 1 hr. and then at 50°C for 2 hrs. The resulting reaction mixture was then poured into 400 ml of iced water and then subjected to the same treatment as in Example 8 to obtain 23.3 g (yield:: 71 %) of a yellow oily material.

Physical constants and elementary analysis values of compound synthesized according to the processes of the present invention are as set forth in Table 1.

Table 1

| Compound No. | Structural formula | Physical constant | Elementary analysis value (%) | | | | | |
|---|---|---|---|---|---|---|---|---|
| | | | | C | H | N | S | Cl | Br |
| 1 | (pyridyl)-N=C(SCH$_3$)(SCH$_2$-C$_6$H$_4$-Cl) | $n_D^{19.5}$ 1.6535 | Cal'd<br>Found | 54.42<br>54.02 | 4.25<br>4.02 | 9.07<br>8.90 | 20.76<br>20.42 | 11.48<br>11.14 | |
| 2 | (pyridyl)-N=C(SC$_2$H$_5$)(SCH$_2$-C$_6$H$_4$-Cl) | $n_D^{20}$ 1.6380 | Cal'd<br>Found | 55.79<br>55.52 | 4.69<br>4.71 | 8.68<br>8.63 | 19.86<br>19.63 | 10.98<br>11.18 | |
| 3 | (pyridyl)-N=C(S-CH(CH$_3$)$_2$)(SCH$_2$-C$_6$H$_4$-Cl) | $n_D^{21}$ 1.6303 | Cal'd<br>Found | 55.45<br>55.42 | 5.28<br>4.95 | 8.62<br>8.26 | 19.73<br>19.01 | 10.91<br>10.56 | |

Table 1 – Continued

| Compound No. | Structural formula | Physical constant | Elementary analysis value (%) | | | | | |
|---|---|---|---|---|---|---|---|---|
| | | | | C | H | N | S | Cl | Br |
| 4 | pyridyl-N=C(SCH₂CH₂CH₂CH₃)(SCH₂-C₆H₄-Cl) | $n_D^{30}$ 1.6200 | Cal'd Found | 58.17 57.96 | 5.46 5.46 | 7.98 7.84 | 18.27 17.97 | 10.10 9.92 | |
| 5 | pyridyl-N=C(SCH₂CH(CH₃)₂)(SCH₂-C₆H₄-Cl) | $n_D^{20}$ 1.6220 | Cal'd Found | 58.17 58.10 | 5.46 5.52 | 7.98 7.97 | 18.27 18.28 | 10.10 10.13 | |
| 6 | pyridyl-N=C(SCH(C₂H₅)(CH₃))(SCH₂-C₆H₄-Cl) | $n_D^{18}$ 1.6237 | Cal'd Found | 58.34 58.30 | 5.20 5.19 | 8.01 8.21 | 18.32 18.20 | 10.13 10.09 | |
| 7 | pyridyl-N=C(SC(CH₃)₃)(SCH₂-C₆H₄-Cl) | $n_D^{21}$ 1.6214 | Cal'd Found | 58.18 57.90 | 5.47 5.50 | 7.98 7.82 | 18.27 18.19 | 10.10 10.23 | |
| 8 | pyridyl-N=C(SCH₂CH₂CH₂CH₂CH₃)(SCH₂-C₆H₄-Cl) | $n_D^{18}$ 1.6161 | Cal'd Found | 59.23 59.45 | 5.81 5.96 | 7.68 7.69 | 17.57 17.32 | 9.71 9.69 | |
| 9 | pyridyl-N=C(SC(CH₃)₂(C₂H₅))(SCH₂-C₆H₄-Cl) | $n_D^{20}$ 1.6165 | Cal'd Found | 59.23 59.50 | 5.81 5.85 | 7.68 7.52 | 17.57 17.60 | 9.71 9.60 | |
| 10 | pyridyl-N=C(SCH₂CH₂CH₂CH₂CH₂CH₃)(SCH₂-C₆H₄-Cl) | $n_D^{23}$ 1.5200 | Cal'd Found | 60.21 60.10 | 6.13 6.05 | 7.39 7.47 | 16.92 16.32 | 9.35 9.25 | |
| 11 | pyridyl-N=C(SC(C₂H₅)₂(CH₃))(SCH₂-C₆H₄-Cl) | $n_D^{21}$ 1.6178 | Cal'd Found | 60.21 60.30 | 6.13 6.15 | 7.39 7.32 | 16.92 16.80 | 9.35 9.20 | |

Table 1—Continued

| Compound No. | Structural formula | Physical constant | Elementary analysis value (%) | | | | | |
|---|---|---|---|---|---|---|---|---|
| | | | C | H | N | S | Cl | Br |
| 12 | pyridine-N=C(SCH$_2$(CH$_2$)$_5$CH$_3$)(SCH$_2$-C$_6$H$_4$-Cl) | $n_D^{20}$ 1.6223 | Cal'd 6.11<br>Found 61.35 | 6.42<br>6.50 | 7.13<br>7.15 | 16.31<br>16.20 | 9.02<br>8.93 | |
| 13 | pyridine-N=C(SCH$_2$(CH$_2$)$_6$CH$_3$)(SCH$_2$-C$_6$H$_4$-Cl) | $n_D^{20}$ 1.5980 | Cal'd 61.96<br>Found 61.83 | 6.70<br>6.67 | 6.88<br>6.90 | 15.75<br>15.80 | 8.71<br>8.73 | |
| 14 | pyridine-N=C(SCH$_2$-C$_6$H$_4$-Cl)(SCH$_2$-C$_6$H$_4$-Cl) | $n_D^{19}$ 1.6504 | Cal'd 57.27<br>Found 56.99 | 3.85<br>3.73 | 6.68<br>6.67 | 15.29<br>15.31 | 16.91<br>17.00 | |
| 15 | pyridine-N=C(SCH$_2$-C$_6$H$_4$-Cl)(SCH$_2$-C$_6$H$_3$Cl$_2$) | $n_D^{21}$ 1.6638 | Cal'd 52.93<br>Found 53.02 | 3.34<br>3.41 | 6.17<br>6.15 | 14.13<br>14.10 | 23.43<br>23.38 | |
| 16 | pyridine-N=C(SCH$_2$-C$_6$H$_5$)(SCH$_2$-C$_6$H$_4$-Cl) | $n_D^{23}$ 1.6461 | Cal'd 62.73<br>Found 62.54 | 3.96<br>3.85 | 7.32<br>7.40 | 16.74<br>16.55 | 9.26<br>9.38 | |
| 17 | pyridine-N=C(SCH$_2$-C$_6$H$_4$-Cl)(SCH$_2$-C$_6$H$_4$-Cl) | $n_D^{21}$ 1.6402 | Cal'd 57.27<br>Found 57.25 | 3.85<br>3.90 | 6.68<br>6.75 | 15.29<br>15.23 | 16.91<br>16.82 | |
| 18 | pyridine-N=C(SCH$_2$-C$_6$H$_4$-Cl)(SCH$_2$-C$_6$H$_4$-Cl) | $n_D^{18}$ 1.6440 | Cal'd 57.27<br>Found 57.30 | 3.85<br>3.85 | 6.68<br>6.67 | 15.29<br>15.30 | 16.91<br>16.93 | |
| 19 | pyridine-N=C(SCH$_3$)(SCH$_2$-C$_6$H$_4$-Cl) | $n_D^{26}$ 1.6509 | Cal'd 54.44<br>Found 54.30 | 4.25<br>4.07 | 9.07<br>8.90 | 20.76<br>20.50 | 11.48<br>11.62 | |
| 20 | pyridine-N=C(SCH$_3$)(SCH$_2$-C$_6$H$_4$-Cl) | $n_D^{21}$ 1.6570 | Cal'd 54.43<br>Found 54.54 | 4.25<br>4.30 | 9.07<br>8.97 | 20.76<br>21.05 | 11.48<br>11.76 | |

Table 1 – Continued

| Compound No. | Structural formula | Physical constant | | Elementary analysis value (%) | | | | | |
|---|---|---|---|---|---|---|---|---|---|
| | | | | C | H | N | S | Cl | Br |
| 21 | pyridine-N=C(SCH₃)(SCH₂-C₆H₃-Cl₂) | $n_D^{26}$ 1.6556 | Cal'd Found | 48.96 48.70 | 3.53 3.48 | 8.16 8.26 | 18.68 18.81 | 20.65 20.15 | |
| 22 | pyridine-N=C(SCH₃)(SCH₂-C₆H₃-Cl₂) | $n_D^{26}$ 1.6508 | Cal'd Found | 48.98 48.90 | 3.53 3.52 | 8.16 8.50 | 18.68 18.72 | 20.65 19.01 | |
| 23 | pyridine-N=C(SCH₃)(SCH₂-C₆H₃-Cl₂) | m.p. 105 – 106°C | Cal'd Found | 48.98 48.95 | 3.53 3.52 | 8.16 8.10 | 18.68 18.79 | 20.65 20.68 | |
| 24 | pyridine-N=C(SCH₃)(SCH₂-C₆H₄-NO₂) | m.p. 76 – 77.5°C | Cal'd Found | 52.64 52.50 | 4.11 4.08 | 13.16 13.17 | 20.07 20.10 | | |
| 25 | pyridine-N=C(SCH₃)(SCH₂-C₆H₄-CH₃) | $n_D^{23}$ 1.6396 | Cal'd Found | 62.45 62.53 | 5.60 5.72 | 9.71 9.61 | 22.23 22.15 | | |
| 26 | pyridine-N=C(SCH₃)(SCH₂-C₆H₅) | $n_D^{23}$ 1.6487 | Cal'd Found | 61.29 61.30 | 5.15 5.23 | 10.21 10.10 | 23.37 23.29 | | |
| 27 | pyridine-N=C(SCH₂(CH₂)₂CH₃)(SCH₂-C₆H₃-Cl₂) | $n_D^{21}$ 1.6300 | Cal'd Found | 52.98 52.46 | 4.72 4.61 | 7.27 6.97 | 16.64 16.50 | 18.40 18.74 | |
| 28 | pyridine-N=C(SCH(CH₃)₂)(SCH₂-C₆H₃-Cl₂) | $n_D^{23}$ 1.6370 | Cal'd Found | 51.74 51.66 | 4.35 4.32 | 7.55 7.61 | 17.27 17.32 | 19.09 19.14 | |
| 29 | pyridine-N=C(SCH(CH₃)₂)(SCH₂-C₆H₄-Br) | $n_D^{21}$ 1.6448 | Cal'd Found | 50.39 50.23 | 4.50 4.45 | 7.35 7.40 | 16.81 16.78 | | 20.95 20.72 |
| 30 | pyridine-N=C(SCH(CH₃)₂)(SCH₂-C₆H₄-F) | $n_D^{20}$ 1.6130 | Cal'd Found | 59.96 60.05 | 5.36 5.32 | 8.74 8.66 | 20.01 20.00 | | (F) 5.93 5.80 |

Table 1—Continued

| Compound No. | Structural formula | Physical constant | | Elementary analysis value (%) | | | | | |
|---|---|---|---|---|---|---|---|---|---|
| | | | | C | H | N | S | Cl | Br |
| 31 | pyridyl-N=C(SCH(CH₃)₂)(SCH₂-C₆H₄-CH₃) | $n_D^{21}$ 1.6213 | Cal'd<br>Found | 64.51<br>64.62 | 6.38<br>6.53 | 8.85<br>8.72 | 20.26<br>20.10 | | |
| 32 | pyridyl-N=C(SCH(CH₃)₂)(SCH₂-C₆H₄-NO₂) | $n_D^{21}$ 1.6425 | Cal'd<br>Found | 55.30<br>55.20 | 4.94<br>4.83 | 12.10<br>12.32 | 18.45<br>18.38 | | |
| 33 | pyridyl-N=C(SCH(CH₃)₂)(SCH₂-C₆H₄-C(CH₃)₃) | m.p. 62 – 63.5°C | Cal'd<br>Found | 66.98<br>67.00 | 7.32<br>7.28 | 7.81<br>7.63 | 17.88<br>17.98 | | |
| 34 | pyridyl-N=C(SCH(CH₃)₂)(SCH₂-C₆H₄-Cl) | $n_D^{23}$ 1.6293 | Cal'd<br>Found | 55.45<br>55.43 | 5.28<br>5.30 | 8.62<br>8.61 | 19.73<br>19.67 | 10.91<br>10.83 | |
| 35 | pyridyl-N=C(SCH₂(CH₂)₃CH₃)(SCH₂-C₆H₃-Cl₂) | $n_D^{15}$ 1.6209 | Cal'd<br>Found | 54.12<br>54.25 | 5.06<br>5.04 | 7.02<br>7.10 | 16.05<br>16.02 | 17.75<br>17.72 | |
| 36 | pyridyl-N=C(OC₂H₅)(SCH₂-C₆H₄-Cl) | $n_D^{26}$ 1.6020 | Cal'd<br>Found | 58.71<br>58.50 | 4.94<br>4.93 | 9.13<br>9.10 | 10.45<br>10.63 | 11.55<br>11.55 | |
| 37 | pyridyl-N=C(SCH(CH₃)₂)(OCH₂-C₆H₄-Cl) | m.p. 91.5 – 93°C | Cal'd<br>Found | 59.89<br>60.08 | 5.35<br>5.48 | 8.73<br>8.67 | 9.99<br>9.95 | 11.05<br>11.01 | |
| 38 | pyridyl-N=C(OCH₂(CH₂)₂CH₃)(SCH₂-C₆H₃-Cl₂) | $n_D^{20}$ 1.5962 | Cal'd<br>Found | 61.15<br>60.97 | 5.45<br>5.41 | 8.39<br>8.24 | 9.60<br>9.68 | 10.62<br>10.55 | |
| 39 | (6-Cl-pyridyl)-N=C(SCH₃)(SCH₂-C₆H₃-Cl₂) | $n_D^{23}$ 1.6610 | Cal'd<br>Found | 44.51<br>44.60 | 2.94<br>2.98 | 7.42<br>7.41 | 16.97<br>16.83 | 28.15<br>28.11 | |

Table 1 - Continued

| Compound No. | Structural formula | Physical constant | Elementary analysis value (%) | | | | | |
|---|---|---|---|---|---|---|---|---|
| | | | | C | H | N | S | Cl | Br |
| 40 | pyridine-N-oxide-N=C(SCH₃)(SCH₂-C₆H₄-Cl) | m.p. 55 – 57.5°C | Cal'd<br>Found | 54.43<br>54.59 | 4.25<br>4.08 | 9.07<br>8.78 | 20.76<br>20.37 | 11.48<br>11.72 | |
| 41 | pyridine-N-oxide-N=C(SCH₂(CH₂)₂CH₃)(SCH₂-C₆H₄-Cl) | $n_D^{21}$ 1.6244 | Cal'd<br>Found | 52.98<br>52.92 | 4.72<br>4.70 | 7.27<br>7.39 | 16.64<br>16.52 | 18.40<br>18.45 | |
| 42 | pyridine-N-oxide-N=C(SCH₂(CH₂)₂CH₃)(SCH₂-C₆H₃-Cl₂) | $n_D^{21}$ 1.6250 | Cal'd<br>Found | 52.98<br>52.80 | 4.72<br>4.72 | 7.27<br>7.14 | 16.64<br>16.44 | 18.40<br>18.37 | |
| 43 | pyridyl-N=C(SCH₃)(SCH₂-C₆H₄-Cl) | m.p. 65 – 67°C | Cal'd<br>Found | 54.43<br>54.01 | 4.25<br>4.22 | 9.07<br>9.16 | 20.76<br>20.38 | 11.48<br>11.21 | |
| 44 | pyridyl-N=C(SCH₃)(SCH₂-C₆H₃-Cl₂) | m.p. 92 – 93.5°C | Cal'd<br>Found | 48.98<br>49.34 | 3.53<br>3.61 | 8.16<br>8.02 | 18.68<br>18.48 | 20.65<br>20.22 | |
| 45 | pyridyl-N=C(SCH₃)(SCH₂-C₆H₃-Cl₂) | $n_D^{23}$ 1.6740 | Cal'd<br>Found | 48.98<br>48.73 | 3.53<br>3.46 | 8.16<br>8.09 | 18.68<br>18.55 | 20.65<br>20.88 | |
| 46 | pyridyl-N=C(SCH₃)(SCH₂-C₆H₃-Cl₂) | $n_D^{23}$ 1.6724 | Cal'd<br>Found | 48.98<br>48.69 | 3.53<br>3.51 | 8.16<br>8.06 | 18.68<br>18.29 | 20.65<br>19.75 | |
| 47 | pyridyl-N=C(SCH₃)(SCH₂-C₆H₂(CH₃)₃) | $n_D^{21}$ 1.6428 | Cal'd<br>Found | 64.51<br>64.41 | 6.38<br>6.24 | 8.85<br>8.73 | 20.26<br>19.98 | | |

Table 1—Continued

| Compound No. | Structural formula | Physical constant | Elementary analysis value (%) | | | | | |
|---|---|---|---|---|---|---|---|---|
| | | | | C | H | N | S | Cl | Br |
| 48 | (pyridine)-N=C(SCH$_3$)(SCH$_2$-tetralin) | $n_D^{24}$ 1.6555 | Cal'd<br>Found | 64.92<br>65.28 | 5.78<br>5.94 | 8.91<br>8.55 | 20.39<br>19.98 | | |
| 49 | (6-CH$_3$-pyridin-2-yl)-N=C(SCH$_3$)(SCH$_2$-C$_6$H$_4$-Cl) | $n_D^{26}$ 1.6465 | Cal'd<br>Found | 55.79<br>56.04 | 4.69<br>4.81 | 8.68<br>9.10 | 19.86<br>19.70 | 10.98<br>10.41 | |
| 50 | C$_6$H$_5$-N=C(OCH$_2$-C$_6$H$_4$-Cl)(SCH$_3$) | $n_D^{27}$ 1.6080 | Cal'd<br>Found | 61.74<br>61.38 | 4.85<br>4.70 | 4.80<br>4.75 | 10.99<br>11.02 | 12.15<br>12.18 | |
| 51 | (3,4-Cl$_2$-C$_6$H$_3$)-N=C(OCH$_2$O-C$_6$H$_3$(CH$_3$)(Cl))(SCH$_3$) | m.p. 79 – 80.5°C | Cal'd<br>Found | 50.44<br>50.21 | 3.99<br>4.00 | 3.46<br>3.48 | 7.92<br>7.86 | 26.28<br>26.19 | |
| 52 | (3,4-Cl$_2$-C$_6$H$_3$)-N=C(SCH$_3$)(SCH$_2$-C$_6$H$_4$-Cl) | m.p. 83.5 – 84.5°C | Cal'd<br>Found | 47.82<br>48.11 | 3.22<br>3.30 | 3.72<br>3.79 | 17.02<br>16.93 | 28.23<br>27.98 | |
| 53 | (3,4-Cl$_2$-C$_6$H$_3$)-N=C(SCH$_3$)(SCH$_2$-C$_6$H$_4$-Cl) | m.p. 52 – 54.5°C | Cal'd<br>Found | 47.82<br>48.23 | 3.22<br>3.25 | 3.72<br>3.58 | 17.02<br>17.76 | 28.23<br>27.89 | |
| 54 | (3,4-Cl$_2$-C$_6$H$_3$)-N=C(SCH$_3$)(SCH$_2$-C$_6$H$_3$Cl$_2$) | $n_D^{26}$ 1.6472 | Cal'd<br>Found | 43.81<br>44.00 | 2.70<br>2.81 | 3.41<br>3.45 | 15.59<br>15.98 | 34.49<br>34.63 | |
| 55 | (3,4-Cl$_2$-C$_6$H$_3$)-N=C(SCH$_3$)(SCH$_2$-C$_6$H$_3$Cl$_2$) | m.p. 94.5 – 96.5°C | Cal'd<br>Found | 43.81<br>43.53 | 2.70<br>2.62 | 3.41<br>3.66 | 15.59<br>15.40 | 34.49<br>34.23 | |
| 56 | (3,4-Cl$_2$-C$_6$H$_3$)-N=C(SCH$_3$)(SCH$_2$-C$_6$H$_3$Cl$_2$) | m.p. 70.5 – 71.5°C | Cal'd<br>Found | 43.81<br>43.68 | 2.70<br>2.73 | 3.41<br>3.31 | 15.59<br>15.68 | 34.49<br>34.17 | |

Table 1 — Continued

| Compound No. | Structural formula | Physical constant | | Elementary analysis value (%) | | | | | |
|---|---|---|---|---|---|---|---|---|---|
| | | | | C | H | N | S | Cl | Br |
| 57 | Cl-C6H3(Cl)-N=C(OCH2-C6H4-Cl)(SCH3) | $n_D^{20}$ 1.6103 | Cal'd<br>Found | 49.95<br>49.62 | 3.36<br>3.49 | 3.88<br>3.98 | 8.89<br>8.90 | 29.49<br>29.25 | |
| 58 | Cl-C6H3(Cl)-N=C(SCH2-C6H4-Cl)(OCH3) | m.p. 43.5 – 45°C | Cal'd<br>Found | 49.95<br>49.80 | 3.36<br>3.35 | 3.88<br>3.92 | 8.89<br>9.10 | 29.49<br>29.14 | |
| 59 | Cl-C6H3(Cl)-N=C(SCH3)(OCH2-C6H4-Cl) | $n_D^{20}$ 1.6103 | Cal'd<br>Found | 49.95<br>49.32 | 3.36<br>3.49 | 3.88<br>3.98 | 8.89<br>8.90 | 29.49<br>29.25 | |
| 60 | C6H5-N=C(OCH3)(SCH2COOCH3) | m.p. 43 – 44.5°C | Cal'd<br>Found | 55.20<br>55.03 | 5.49<br>5.32 | 5.85<br>5.87 | 13.40<br>13.63 | 20.06<br>20.26 | |
| 61 | Cl-C6H4-N=C(OCH3)(SCH2·COOCH3) | $n_D^{19.5}$ 1.5777 | Cal'd<br>Found | 48.26<br>47.94 | 4.43<br>4.30 | 5.12<br>5.21 | 11.71<br>11.86 | 12.95<br>13.08 | |
| 62 | Cl-C6H3(Cl)-N=C(OCH3)(SCH2-C6H4-Cl) | m.p. 43.5 – 45°C | Cal'd<br>Found | 49.95<br>49.80 | 3.36<br>3.35 | 3.88<br>3.92 | 8.89<br>9.10 | 29.49<br>29.14 | |
| 63 | Cl-C6H3(Cl)-N=C(O-CH(CH3)CO2C2H5)(O-CH(CH3)CO2C2H5) | $n_D^{21}$ 1.5071 | Cal'd<br>Found | 47.13<br>46.87 | 5.55<br>5.43 | 3.66<br>3.59 | | 18.55<br>19.02 | |
| 64 | Cl-C6H3(Cl)-N=C(SCH3)(SCH2-C6H4-Cl) | m.p. 62 – 64°C | Cal'd<br>Found | 47.81<br>47.41 | 3.22<br>3.27 | 3.72<br>3.89 | 17.03<br>16.88 | 28.22<br>27.93 | |
| 65 | (CH3)2-C6H3-N=C(SCH3)(SCH2-C6H4-Cl) | $n_D^{22}$ 1.6311 | Cal'd<br>Found | 60.77<br>60.60 | 5.41<br>5.17 | 4.19<br>4.00 | 19.08<br>18.93 | 10.55<br>10.82 | |
| 66 | (CH3)2-C6H3-N=C(SCH3)(SCH2-C6H4-Cl) | $n_D^{22}$ 1.6440 | Cal'd<br>Found | 60.77<br>60.65 | 5.41<br>5.42 | 4.19<br>4.16 | 19.08<br>19.01 | 10.55<br>10.19 | |

Table I —Continued

| Compound No. | Structural formula | Physical constant | | C | H | N | S | Cl | Br |
|---|---|---|---|---|---|---|---|---|---|
| 67 | Ph-N=C(SCH₃)(SCH₂CO₂C₂H₅) | $n_D^{20.5}$ 1.6084 | Cal'd Found | 53.50 53.90 | 5.61 5.60 | 5.20 5.13 | 23.81 23.17 | | |
| 68 | Ph-N=C(SCH₃)(SCH₂CH=CH₂) | $n_D^{20}$ 1.6039 | Cal'd Found | 60.71 60.85 | 6.37 6.29 | 5.90 5.99 | 27.02 26.84 | | |
| 69 | 2,6-(CH₃)₂C₆H₃-N=C(SCH₃)(SCH₂C≡CH) | $n_D^{20}$ 1.6109 | Cal'd Found | 62.60 62.48 | 6.07 6.03 | 5.62 5.56 | 25.71 26.13 | | |
| 70 | 2,6-(C₂H₅)₂C₆H₃-N=C(SCH₃)(SCH₂CHCH₂ with OH OH) | $n_D^{22}$ 1.5690 | Cal'd Found | 57.46 57.36 | 7.41 7.11 | 4.47 4.05 | 20.46 19.98 | | |
| 71 | 2-Cl-C₆H₄-N=C(SCH₃)(SCH₂CH₂OH) | $n_D^{26}$ 1.6343 | Cal'd Found | 45.87 45.58 | 4.62 4.53 | 5.35 5.40 | 24.50 25.01 | 13.54 13.48 | |
| 72 | 4-Cl-C₆H₄-N=C(SCH₃)(SCH₂CH₂OH) | $n_D^{26.5}$ 1.6252 | Cal'd Found | 45.87 45.39 | 4.62 4.60 | 5.35 5.20 | 24.50 24.33 | 13.54 12.98 | |
| 73 | 4-Br-C₆H₄-N=C(SCH₃)(SCH₂CH₂OH) | $n_D^{21}$ 1.6219 | Cal'd Found | 39.19 39.13 | 3.96 3.92 | 4.57 4.53 | 20.94 20.89 | | 20.69 26.38 |
| 74 | 2,3-(CH₃)₂C₆H₃-N=C(SCH₃)(SCH₂CH₂OH) | $n_D^{25.5}$ 1.6070 | Cal'd Found | 56.42 56.41 | 6.72 6.68 | 5.49 5.40 | 25.10 24.92 | | |
| 75 | 2,4-(CH₃)₂C₆H₃-N=C(SCH₃)(SCH₂CH₂OH) | $n_D^{20}$ 1.6073 | Cal'd Found | 56.42 56.38 | 6.72 6.70 | 5.49 5.26 | 25.10 25.23 | | |
| 76 | 2,6-(CH₃)₂C₆H₃-N=C(SCH₃)(SCH₂CH₂OH) | $n_D^{21.5}$ 1.5971 | Cal'd Found | 56.42 56.43 | 6.72 6.78 | 5.49 5.37 | 25.10 25.08 | | |

Table 1—Continued

| Compound No. | Structural formula | Physical constant | Elementary analysis value (%) | | | | | |
|---|---|---|---|---|---|---|---|---|
| | | | | C | H | N | S | Cl | Br |
| 77 | 2,3-dimethylphenyl-N=C(SCH₃)(SCH₂CH₂OH) | $n_D^{25.5}$ 1.6127 | Cal'd<br>Found | 56.42<br>56.71 | 6.72<br>6.81 | 5.49<br>5.39 | 25.10<br>24.83 | | |
| 78 | 2,4,6-trimethylphenyl-N=C(SCH(CH₃)₂)(SCH₂CH₂OH) | $n_D^{21}$ 1.5703 | Cal'd<br>Found | 59.31<br>59.20 | 7.48<br>7.39 | 4.94<br>4.86 | 22.62<br>23.03 | | |
| 79 | 2,6-dimethylphenyl-N=C(SCH₂CH₂CH₃)(SCH₂CH₂OH) | $n_D^{21}$ 1.5703 | Cal'd<br>Found | 59.31<br>59.30 | 7.48<br>7.45 | 4.94<br>4.91 | 22.62<br>22.86 | | |
| 80 | 2,6-dimethylphenyl-N=C(SCH₃)(SCH₂CH₂OH) | $n_D^{25.5}$ 1.6004 | Cal'd<br>Found | 56.42<br>56.16 | 6.72<br>6.67 | 5.49<br>5.38 | 25.10<br>25.97 | | |
| 81 | 2,6-diethylphenyl-N=C(SCH₃)(SCH₂CH₂OH) | $n_D^{21}$ 1.5882 | Cal'd<br>Found | 59.31<br>58.99 | 7.48<br>7.32 | 4.94<br>4.86 | 22.62<br>23.03 | | |
| 82 | pyridyl-N=C(SCH₃)(SCH₂-C₆H₄-C(CH₃)₃) | $n_D^{21}$ 1.6100 | Cal'd<br>Found | 65.40<br>65.31 | 6.72<br>6.70 | 8.48<br>8.51 | 19.40<br>19.50 | | |
| 83 | pyridyl-N=C(SC₂H₅)(SCH₂-C₆H₄-C(CH₃)₃) | $n_D^{21}$ 1.6173 | Cal'd<br>Found | 66.22<br>66.31 | 7.03<br>7.10 | 8.13<br>8.15 | 18.61<br>18.53 | | |
| 84 | pyridyl-N=C(SCH₂CH₂CH₂CH₃)(SCH₂-C₆H₄-C(CH₃)₃) | $n_D^{26}$ 1.5960 | Cal'd<br>Found | 67.68<br>67.87 | 7.59<br>7.49 | 7.52<br>7.59 | 17.21<br>19.31 | | |

Table 1 – Continued

| Compound No. | Structural formula | Physical constant | | Elementary analysis value (%) | | | | | |
|---|---|---|---|---|---|---|---|---|---|
| | | | | C | H | N | S | Cl | Br |
| 85 | (pyridyl)N=C(SCH₂CH(CH₃)CH₃)(SCH₂-C₆H₄-C(CH₃)₃) | $n_D^{22}$ 1.5887 | Cal'd Found | 67.68 67.61 | 7.59 7.57 | 7.52 7.59 | 17.21 17.30 | | |
| 86 | (pyridyl)N=C(SCH(CH₂CH₃)(CH₃))(SCH₂-C₆H₄-C(CH₃)₃) | $n_D^{25}$ 1.5969 | Cal'd Found | 67.68 67.78 | 7.59 7.63 | 7.52 7.44 | 17.21 17.15 | | |
| 87 | (pyridyl)N=C(S-C(CH₃)₃)(SCH₂-C₆H₄-C(CH₃)₃) | m.p. 89.5 - 90.5°C | Cal'd Found | 67.68 67.75 | 7.59 7.49 | 7.52 7.50 | 17.21 17.18 | | |
| 88 | (pyridyl)N=C(SCH₂(CH₂)₃CH₃)(SCH₂-C₆H₄-C(CH₃)₃) | $n_D^{23}$ 1.5896 | Cal'd Found | 68.33 68.21 | 7.84 7.69 | 7.25 7.35 | 16.58 16.62 | | |
| 89 | (pyridyl)N=C(SC(CH₂CH₃)(CH₃)₂)(SCH₂-C₆H₄-C(CH₃)₃) | $n_D^{21}$ 1.5944 | Cal'd Found | 68.33 68.41 | 7.84 7.90 | 7.25 7.15 | 16.58 16.50 | | |
| 90 | (pyridyl)N=C(SCH₂(CH₂)₄CH₃)(SCH₂-C₆H₄-C(CH₃)₃) | $n_D^{25}$ 1.5830 | Cal'd Found | 68.94 68.79 | 8.07 7.97 | 6.99 6.68 | 16.00 16.51 | | |
| | | $n_D^{31}$ | Cal'd | 68.94 | 8.07 | 6.89 | 16.00 | | |

Table 1—Continued

| Compound No. | Structural formula | Physical constant | Elementary analysis value (%) | | | | | |
|---|---|---|---|---|---|---|---|---|
| | | | C | H | N | S | Cl | Br |
| 91 | (structure with S-C(CH₂CH₃)(CH₂CH₃)(CH₃), N=C, pyridine, SCH₂-C₆H₄-C(CH₃)₃) | $n_D^{25}$ 1.5855 Found | 68.85 | 8.13 | 6.72 | 15.89 | | |
| 92 | (structure with SCH₂(CH₂)₅CH₃, N=C, pyridine, SCH₂-C₆H₄-C(CH₃)₃) | $n_D^{25}$ 1.5816 Cal'd / Found | 69.50 / 69.45 | 8.28 / 8.18 | 6.76 / 6.73 | 15.46 / 15.53 | | |
| 93 | (structure with OC₂H₅, N=C, pyridine, SCH₂-C₆H₄-C(CH₃)₃) | m.p. 77–78°C Cal'd / Found | 69.46 / 69.55 | 7.38 / 7.42 | 8.53 / 8.39 | 9.76 / 9.61 | | |
| 94 | (structure with OCH₂CH₂CH₃, N=C, pyridine, SCH₂-C₆H₄-C(CH₃)₃) | $n_D^{25}$ 1.5670 Cal'd / Found | 70.12 / 70.08 | 7.67 / 7.65 | 8.18 / 8.23 | 9.36 / 9.33 | | |
| 95 | (structure with O-CH(CH₃)₂, N=C, pyridine, SCH₂-C₆H₄-C(CH₃)₃) | m.p. 50.5–52°C Cal'd / Found | 70.12 / 70.11 | 7.67 / 7.65 | 8.18 / 8.23 | 9.36 / 9.30 | | |
| 96 | (structure with OCH₂CH₂CH₂CH₃, N=C, pyridine, SCH₂-C₆H₄-C(CH₃)₃) | m.p. 50–51°C Cal'd / Found | 70.73 / 70.69 | 7.93 / 7.86 | 7.86 / 7.92 | 8.99 / 9.01 | | |
| 97 | (structure with OCH₂CH(CH₃)₂, N=C, pyridine, SCH₂-C₆H₄-C(CH₃)₃) | $n_D^{26}$ 1.5490 Cal'd / Found | 70.73 / 70.56 | 7.93 / 7.86 | 7.86 / 7.90 | 8.99 / 9.03 | | |

Table I – Continued

| Compound No. | Structural formula | Physical constant | Elementary analysis value (%) | | | | | |
|---|---|---|---|---|---|---|---|---|
| | | | C | H | N | S | Cl | Br |
| 98 | (3-pyridyl)-N=C(O-CH(CH₂CH₃)(CH₃))(SCH₂-C₆H₄-C(CH₃)₃) | $n_D^{25}$ 1.5560 | Cal'd 70.73<br>Found 70.63 | 7.93<br>7.96 | 7.86<br>7.81 | 8.99<br>9.10 | | |
| 99 | (3-pyridyl)-N=C(OCH₂(CH₂)₃CH₃)(SCH₂-C₆H₄-C(CH₃)₃) | m.p. 49.5 – 50.5°C | Cal'd 71.30<br>Found 71.31 | 8.18<br>8.20 | 7.56<br>7.40 | 8.65<br>8.53 | | |
| 100 | (3-pyridyl)-N=C(OCH(CH₂CH₃)(CH₃) extended)(SCH₂-C₆H₄-C(CH₃)₃) | $n_D^{25}$ 1.5526 | Cal'd 71.30<br>Found 71.21 | 8.18<br>8.15 | 7.56<br>7.48 | 8.65<br>8.78 | | |
| 101 | (3-pyridyl)-N=C(O-CH(CH(CH₃)₂)(CH₃))(SCH₂-C₆H₄-C(CH₃)₃) | $n_D^{30}$ 1.5541 | Cal'd 71.30<br>Found 71.23 | 8.18<br>8.17 | 7.56<br>7.55 | 8.65<br>8.69 | | |
| 102 | (3-pyridyl)-N=C(OCH₂CH₂CH(CH₃)₂)(SCH₂-C₆H₄-C(CH₃)₃) | $n_D^{26}$ 1.5480 | Cal'd 71.30<br>Found 71.41 | 8.18<br>8.25 | 7.56<br>7.60 | 8.65<br>8.45 | | |
| 103 | (3-pyridyl)-N=C(O-CH(cyclobutyl))(SCH₂-C₆H₄-C(CH₃)₃) | $n_D^{32}$ 1.5703 | Cal'd 71.69<br>Found 71.60 | 7.67<br>7.62 | 7.60<br>7.63 | 8.70<br>8.81 | | |

Table 1—Continued

| Compound No. | Structural formula | Physical constant | Elementary analysis value (%) | | | | | |
|---|---|---|---|---|---|---|---|---|
| | | | C | H | N | S | Cl | Br |
| 104 | | m.p. 78 – 79°C | Cal'd 72.20<br>Found 72.25 | 7.92<br>7.91 | 7.32<br>7.33 | 8.38<br>8.32 | | |
| 105 | | $n_D^{27.5}$ 1.5622 | Cal'd 72.67<br>Found 72.58 | 8.15<br>8.30 | 7.06<br>7.18 | 8.08<br>8.01 | | |
| 106 | | $n_D^{27.5}$ 1.5652 | Cal'd 72.67<br>Found 72.81 | 8.15<br>8.09 | 7.06<br>7.18 | 8.08<br>8.15 | | |
| 107 | | $n_D^{27.5}$ 1.5597 | Cal'd 72.67<br>Found 72.33 | 8.15<br>8.31 | 7.06<br>7.03 | 8.08<br>8.10 | | |
| 108 | | $n_D^{27.5}$ 1.5336 | Cal'd 73.11<br>Found 73.32 | 8.36<br>8.45 | 6.82<br>6.71 | 7.81<br>7.63 | | |
| 109 | | $n_D^{27.5}$ 1.5530 | Cal'd 73.11<br>Found 73.01 | 8.36<br>8.21 | 6.82<br>6.98 | 7.81<br>7.90 | | |

Table 1 – Continued

| Compound No. | Structural formula | Physical constant | Elementary analysis value (%) | | | | | |
|---|---|---|---|---|---|---|---|---|
| | | | C | H | N | S | Cl | Br |
| 110 | (pyridyl)N=C(O-CH(CH2-CH(CH3)-CH2-CH2-CH2-CH))(S-CH2-C6H4-C(CH3)3) | m.p. 118 – 119°C | Cal'd 73.11<br>Found 73.03 | 8.36<br>8.40 | 6.82<br>6.92 | 7.81<br>7.87 | | |
| 111 | (pyridyl)N=C(O-CH(CH2-C(CH3)(CH3)-CH2-CH2-CH(CH3)-CH))(S-CH2-C6H4-C(CH3)3) | m.p. 126.5 – 127.5°C | Cal'd 73.52<br>Found 73.43 | 8.56<br>8.38 | 6.60<br>6.72 | 7.55<br>7.66 | | |
| 112 | (pyridyl)N=C(S-CH(CH2-CH2-CH2-CH2-CH2))(SCH2-C6H4-C(CH3)3) | $n_D^{27.5}$ 1.5830 | Cal'd 69.29<br>Found 68.91 | 7.60<br>7.57 | 7.03<br>7.25 | 16.08<br>16.18 | | |
| 113 | (pyridyl)N=C(OCH2(CH2)6CH3)(SCH2-C6H4-C(CH3)3) | $n_D^{25}$ 1.5418 | Cal'd 72.75<br>Found 72.50 | 8.81<br>8.73 | 6.79<br>6.68 | 7.77<br>7.81 | | |
| 114 | (pyridyl)N=C(SCH3)(SCH2-C6H4-CH(CH3)2) | $n_D^{26}$ 1.6200 | Cal'd 64.51<br>Found 64.48 | 6.38<br>6.37 | 8.85<br>8.61 | 20.26<br>20.13 | | |

Table 1—Continued

| Compound No. | Structural formula | Physical constant | Elementary analysis value (%) | | | | | |
|---|---|---|---|---|---|---|---|---|
| | | | C | H | N | S | Cl | Br |
| 115 | pyridyl-N=C(SC$_2$H$_5$)(SCH$_2$-C$_6$H$_4$-CH(CH$_3$)$_2$) | $n_D^{25.5}$ 1.6141 | Cal'd 65.40 Found 65.31 | 6.72 6.71 | 8.48 8.45 | 19.40 19.61 | | |
| 116 | pyridyl-N=C(SCH$_2$(CH$_2$)$_5$CH$_3$)(SCH$_2$-C$_6$H$_4$-CH(CH$_3$)$_2$) | $n_D^{25.5}$ 1.5700 | Cal'd 68.94 Found 68.83 | 8.07 8.01 | 6.99 6.73 | 16.00 15.91 | | |
| 117 | pyridyl-N=C(SCH$_2$-C$_6$H$_4$-CH(CH$_3$)$_2$)(SCH$_2$-C$_6$H$_4$-CH(CH$_3$)$_2$) | $n_D^{23}$ 1.6162 | Cal'd 71.83 Found 71.79 | 6.97 6.88 | 6.45 6.53 | 14.75 14.80 | | |
| 118 | pyridyl-N=C(SCH$_2$-C$_6$H$_4$-C(CH$_3$)$_3$)(SCH$_2$-C$_6$H$_4$-C(CH$_3$)$_3$) | m.p. 77–80°C | Cal'd 72.67 Found 72.18 | 7.42 7.35 | 6.05 6.10 | 13.86 13.71 | | |
| 119 | pyridyl-N=C(SCH$_2$CH(CH$_3$)$_2$)(OCH$_2$-C$_6$H$_4$-Cl) | $n_D^{22}$ 1.5788 | Cal'd 60.97 Found 60.63 | 5.73 5.71 | 8.37 8.31 | 9.57 9.55 | 10.59 10.70 | |
| 120 | pyridyl-N=C(OCH$_2$CH(CH$_3$)$_2$)(SCH$_2$-C$_6$H$_4$-Cl) | m.p. 52–53°C | Cal'd 60.97 Found 61.07 | 5.73 5.81 | 8.37 8.29 | 9.57 9.53 | 10.59 10.61 | |

Table 1—Continued

| Compound No. | Structural formula | Physical constant | Elementary analysis value (%) | | | | | |
|---|---|---|---|---|---|---|---|---|
| | | | C | H | N | S | Cl | Br |
| 121 | pyridyl-N=C(OCH₂CH₂CH₂CH₃)(SCH₂-C₆H₄-Br) | m.p. 64.5 – 65.5°C | Cal'd 53.82<br>Found 53.90 | 5.06<br>5.10 | 7.39<br>7.41 | 8.45<br>8.31 | | 21.06<br>20.92 |
| 122 | pyridyl-N=C(SCH₂CH₂CH₂CH₃)(SCH₂-C₆H₄-Br) | $n_D^{22}$ 1.6370 | Cal'd 51.64<br>Found 51.58 | 4.85<br>4.90 | 7.09<br>7.01 | 16.22<br>16.10 | | 20.21<br>20.38 |
| 123 | pyridyl-N=C(SCH₂(CH₂)₁₀CH₃)(SCH₂-C₆H₄-Cl) | $n_D^{21}$ 1.5740 | Cal'd 64.82<br>Found 64.75 | 7.63<br>7.55 | 6.05<br>6.01 | 13.84<br>13.92 | 7.65<br>7.51 | |
| 124 | pyridyl-N=C(SCH₂(CH₂)₁₂CH₃)(SCH₂-C₆H₄-Cl) | $n_D^{22}$ 1.5701 | Cal'd 66.01<br>Found 66.10 | 8.02<br>8.15 | 5.70<br>5.63 | 13.05<br>13.12 | 7.22<br>7.13 | |
| 125 | pyridyl-N=C(SCH₂(CH₂)₁₄CH₃)(SCH₂-C₆H₄-Cl) | $n_D^{23}$ 1.5610 | Cal'd 67.07<br>Found 67.23 | 8.36<br>8.44 | 5.40<br>5.39 | 12.35<br>12.38 | 6.83<br>6.71 | |
| 126 | pyridyl-N=C(SCH₂(CH₂)₁₆CH₃)(SCH₂-C₆H₄-Cl) | $n_D^{23}$ 1.5560 | Cal'd 68.02<br>Found 68.11 | 8.67<br>8.59 | 5.12<br>5.30 | 11.71<br>11.62 | 6.48<br>6.53 | |

EXAMPLE 10

Rice blast-controlling effects:

Rice plants (variety: "WASEASAHI"), which had been cultivated to the 3-leaves stage in flower pots of 9 cm in diameter, were sprayed with 7 ml per pot of each of aqueous dilutions of test compounds in the form of wettable powders. After 1 day, the plants were sprayed and inoculated with a spore-suspension of rice blast fungus (*Pyricularia oryzae*) and, 4 days thereafter, the number of disease spots generated was counted to investigate the microbicidal effects of the individual compounds to obtain such results as shown in Table 2.

The present compounds displayed markedly excellent preventive effects as compared with the known control compounds.

Table 2

| Compound No. | Active ingredient concentration (p.p.m.) | Preventive value (%) |
| --- | --- | --- |
| (62) | 500 | 68.9 |
| (1) | 500 | 74.5 |
| (81) | 500 | 96.8 |
| (59) | 500 | 73.5 |
| (63) | 500 | 83.4 |
| (67) | 500 | 69.5 |
| (70) | 500 | 82.7 |
| (71) | 500 | 96.5 |
| (73) | 500 | 98.2 |
| (74) | 500 | 90.3 |
| (75) | 500 | 97.6 |
| (79) | 500 | 83.7 |
| (80) | 500 | 96.5 |
| (3) | 500 | 96.2 |
| (19) | 500 | 98.4 |
| (20) | 500 | 94.1 |
| (21) | 500 | 93.6 |
| (22) | 500 | 91.5 |
| (23) | 500 | 95.2 |
| (25) | 500 | 97.3 |
| (26) | 500 | 99.1 |
| (36) | 500 | 99.2 |
| (49) | 500 | 98.6 |
| (55) | 500 | 97.4 |
| (57) | 500 | 97.4 |
| 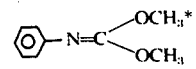 * | 500 | 12.4 |
| 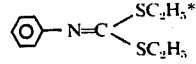 * | 500 | 19.5 |
| 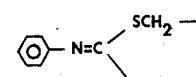 * | 500 | 23.4 |
| Non-spraying | — | 0 |

*Control.

$$\text{Preventive value (\%)} = \frac{\text{(Number of spots in non-treated area)} - \text{(Number of spots in treated area)}}{\text{Number of spots in non-treated area}} \times 100$$

Table 3

| Compound No. | Active ingredient Concentration (p.p.m.) | Stand (%) |
| --- | --- | --- |
| (61) | 500 | 78.9 |
| (1) | 500 | 98.6 |
| (60) | 500 | 97.3 |
| (64) | 500 | 70.5 |
| (65) | 500 | 68.4 |
| (68) | 500 | 72.4 |
| (69) | 500 | 71.1 |
| (72) | 500 | 98.4 |
| (76) | 500 | 99.5 |
| (77) | 500 | 89.6 |
| (78) | 500 | 82.7 |
| 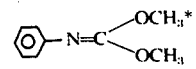 * | 500 | 8.7 |
| 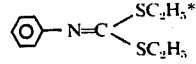 * | 500 | 13.8 |
| 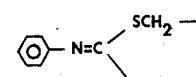 * | 500 | 15.0 |
| Non-treatment, uninoculated | — | 100 |
| Non-treatment, inoculated | — | 0 |

*Control

Further, the above-mentioned compounds of the present invention display activities against other diseases. For example, even when used at concentrations of less than 2,000 p.p.m., the present compounds display activities against sheath blight, helminthosporium leaf spot, bacterial leaf blight, sclerotinia rot and southern blight, and such pathogens of fruit trees as cork spot fungus of apple, black spot fungus of pear and ripe rot fungus of grape. Moreover, some of the present compounds show microbicidal activities even when used at concentrations of less than 8 p.p.m. (on agar medium).

EXAMPLE 11

Cucumber damping off-controlling effects:

Farm soil was packed in flower pots of 9 cm in diameter. Over the surface of said soil was uniformly spread each 10 ml of pathogenic soil, in which had been cultured and propagated damping-off fungus (*Pellicularia filamentosa*). Subsequently, each of aqueous 500 p.p.m. dilutions of test compounds in the form of emulsifiable concentrates was applied to the soil in a proportion of 15 ml per pot. After 2 hours, 10 seeds of cucumber (variety: "KAIRYO AODAICHO") were sowed in the soil and, 5 days thereafter, the damaged state of cucumber seedlings was investigated. As the result, the present compounds displayed markedly excellent effects as compared with the control homologous compounds, as set forth in Table 3.

EXAMPLE 12

Cucurbitaceous powdery mildew-controlling effects:

When cucumber seedlings (variety "KAGA AONAGAFUSINARI"), which had been cultivated in polyethylene pots of 9 cm in diameter (2 seedlings per pot), had grown to the 1 – 2 leaves stage, the seedlings were sprayed with 10 ml per pot of each of aqueous dilutions of test compounds in the form of emulsifiable concentrates. After 24 hours and 48 hours, the seedlings were sprayed and inoculated with a spore- $$\text{Stand (\%)} = \frac{\text{Number of sound seedlings in each treated area}}{\text{Number of germinated seedlings in non-treated and uninoculated area}} \times 100$$

suspension of cucurbitaceous powdery mildew fungus (*Sphaerotheca fuliginea*) and 10 to 15 days thereafter, the degree of damage of the seedlings was calculated by investigating the infections state thereof which had been divided into 6 grades from the infection index 0 — none of disease spot or colony were observed in the leaves, to the infection index 5 — disease spots or colonies were observed all over the leaves. In this test, 3 pots were tested per one treatment. The degree of damage was calculated according to the following equation:

ene pots each containing 400 g of soil had developed to a length of about 7 cm, 20 ml of each of aqueous dilutions of test compounds in the form of emulsifiable concentrates was uniformly applied to the soil. After 24 hours and 48 hours, the seedlings were aprayed and inoculated with a spore-suspension of cucurbitaceous powdery mildew fungus (*Sphaerotheca fuliginea*) and, 10 days thereafter, the degree of damage of the seedlings was calculated by investigating the infectious state thereof which had been divided in such 6 grades as in $$\text{Degree of damage (\%)} = \frac{\Sigma(\text{Infection index} \times \text{Number of leaves})}{\text{Number of investigated leaves} \times 5} \times 100$$

The results obtained were as set forth in Table 4. As seen in Table 4, the present compounds displayed markedly excellent effects as compared with the control compounds and commercially available fungicide.

Example 12. In this test, 3 pots were tested per one treatment. The results obtained were as set forth in Table 5. As seen in Table 5, the present compounds displayed markedly excellent effects as compared with the control compounds and commercially available fungicide.

Table 4

| Compound No. | Active ingredient concentration (p.p.m.) | Degree of damage (%) |
|---|---|---|
| (5) | 500 | 9.0 |
| (6) | 500 | 6.1 |
| (7) | 500 | 7.0 |
| (8) | 500 | 5.0 |
| (9) | 500 | 8.2 |
| (17) | 500 | 4.5 |
| (29) | 500 | 9.5 |
| (3) | 500 | 7.3 |
| (4) | 500 | 5.4 |
| (20) | 500 | 3.5 |
| (21) | 500 | 5.0 |
| (22) | 500 | 10.8 |
| (23) | 500 | 3.0 |
| (27) | 500 | 2.5 |
| (43) | 500 | 2.0 |
| Ph-N=C(SCH₃)(SCH₃)* | 500 | 67.5 |
| Ph-N=C(OCH₃)(OCH₃) | 500 | 59.6 |
| Ph-N=C(SCH₂Ph)(SCH₂Ph)* | 500 | 70.1 |
| Non-spraying | — | 100 |
| Dinitro (methylheptyl)-phenylcrotonate** | 200 | 12.2 |

*Control
**Commercially available powdery mildew fungicide

Table 5

| Compound No. | Active ingredient concentration (p.p.m.) | Degree of damage (%) |
|---|---|---|
| (3) | 1,000 | 9.5 |
| (4) | 1,000 | 8.7 |
| (20) | 1,000 | 6.1 |
| (21) | 1,000 | 7.5 |
| (22) | 1,000 | 10.3 |
| (23) | 1,000 | 4.8 |
| (27) | 1,000 | 5.9 |
| (43) | 1,000 | 6.2 |
| (35) | 1,000 | 3.6 |
| Ph-N=C(SCH₃)(SCH₃)* | 1,000 | 40.7 |
| Ph-N=C(OCH₃)(OCH₃)* | 1,000 | 43.3 |
| Ph-N=C(SCH₂Ph)(SCH₂Ph)* | 1,000 | 50.5 |
| (benzothiazole compound)** | 1,000 | 9.8 |
| Non-treatment | — | 67.0 |

*Control
**Commercially available powdery mildew fungicide

EXAMPLE 13

Cucurbitaceous powdery mildew-controlling effects:
When the first leaf of cucumber seedlings (variety: "OCHIAI FUSINARI") cultivated in 9 cm polyethyl-

EXAMPLE 14

Mouse oral acute toxicity:
Test animal: Commercially available male mice of about 20 g in body weight.
Manner of administration of test compound: Each of test compounds in the form of emulsifiable concentrates was orally administrated in a dose of 0.2 ml per 10 g of the mouse.
Observation period: 7 Days.

$LD_{50}$: Calculated according to Litchfield & Wilcoxon method.

The results obtained were as set forth in Table 6.

Table 6

| Compound No. | Oral acute toxicity | |
|---|---|---|
| | $LD_{50}$ (mg/kg) | TLM (ppm) |
| (3) | >600 | |
| (4) | >600 | 0.1 – 1.0 |
| (6) | >600 | 0.5 – 1.0 |
| (9) | >600 | >0.5 |
| (10) | >600 | >1 |
| (11) | >600 | 0.1 – 1.0 |
| (12) | >750 | >1 |
| (13) | >1000 | >1 |
| (15) | >1000 | >1 |
| (18) | >600 | ≈1.0 |
| (20) | ≧1000 | |
| (23) | >1000 | |
| (27) | ≧ 800 | |
| (29) | >1000 | 0.1 – 0.5 |
| (33) | >1000 | ≈1.0 |
| (36) | ≧ 700 | |
| (38) | >600 | 0.1 – 1.0 |
| (82) – (126) | >1000 | >1 |

As is clear from Table 6, all the compounds of the present invention are extremely low in toxicity to mammals and fishes.

EXAMPLE 15

The activities of the compounds shown in Table 7 against industrial molds (*Asperigillus niger* ATCC 9642) were tested according to agar dilution method. The results obtained were as set forth in Table 7.

Table 7

| Compound No. | Effective concentration (p.p.m.) |
|---|---|
| (1) | 1,000 > |
| (80) | 1,000 > |
| (60) | 1,000 > |

The expression 1,000> shows that the test compounds were effective at a concentration of 1,000 p.p.m., and were not tested at lower concentrations.

EXAMPLE 16

Cucurbitaceous powdery mildew-controlling effects: When cucumber seedlings (variety: "KAGAAONAGAFUSINARI"), which had been cultivated in flower pots (one seedling per pot), had grown to the three leaves stage, they were sprayed with an emulsion of a compound as shown in Table 8 at a concentration as shown in Table 8 in a proportion of 15 ml per pot by means of a spray gun. After the spraying, the seedlings were allowed to stand in a hothouse, and after 24 hrs. and 48 hrs., a suspension of spores of cucurbitaceous powdery mildew fungus (*Sphaerotheca fuliginea*) was sprayed thereto to inoculate the fungus. 15 Days after the inoculation, the state of disease of each leaf was investigated based on 6 grades (that is, from infection index 0, which refers to none of disease spot or colony being observed on leaves, to infection index 5, which refers to disease spots or colonies being observed all over the leaves), and the degree of damage was calculated based thereon. In the present test, 3 pots were used per treatment. The results obtained were as shown in Table 8, from which it is clearly seen that the present compounds are superior to commercially available fungicides, and in addition, the excellent effect of the present compounds is exhibited even at a very low concentration.

Table 8

| Compound No. | Active ingredient concentration (ppm) | Degree of damage (%) | Preventive value (%) |
|---|---|---|---|
| (33) | 50 | 11.0 | 89.0 |
| (82) | " | 28.0 | 72.0 |
| (83) | " | 25.0 | 75.0 |
| (84) | " | 0.0 | 100.0 |
| (85) | " | 15.0 | 85.0 |
| (86) | " | 0.0 | 100.0 |
| (87) | " | 3.0 | 97.0 |
| (88) | " | 12.0 | 88.0 |
| (89) | " | 0.0 | 100.0 |
| (90) | " | 2.0 | 98.0 |
| (91) | " | 0.0 | 100.0 |
| (92) | " | 12.0 | 88.0 |
| (93) | " | 32.0 | 68.0 |
| (94) | " | 25.0 | 75.0 |
| (95) | " | 15.0 | 85.0 |
| (96) | " | 11.0 | 89.0 |
| (97) | " | 2.0 | 98.0 |
| (98) | " | 8.0 | 92.0 |
| (99) | " | 5.0 | 95.0 |
| (100) | " | 5.0 | 95.0 |
| (101) | " | 9.0 | 91.0 |
| (102) | " | 3.0 | 97.0 |
| (103) | " | 15.0 | 85.0 |
| (104) | " | 15.0 | 85.0 |
| (113) | " | 5.0 | 95.0 |
| (114) | " | 30.0 | 70.0 |
| (115) | " | 26.0 | 74.0 |
| (116) | " | 15.0 | 85.0 |
| (117) | " | 20.0 | 80.0 |

Table 8 — Continued

| Compound No. | Active ingredient concentration (ppm) | Degree of damage (%) | Preventive value (%) |
|---|---|---|---|
| (118) | 50 | 15.0 | 85.0 |
| (119) | " | 25.0 | 75.0 |
| (120) | " | 21.0 | 79.0 |
| (121) | " | 15.0 | 85.0 |
| (122) | " | 18.0 | 82.0 |
| (123) | " | 15.0 | 85.0 |
| (124) | " | 28.0 | 72.0 |
| (125) | " | 31.0 | 69.0 |
| (126) | " | 29.0 | 71.0 |
| 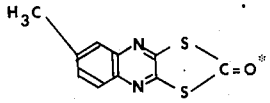 | " | 40.0 | 68.0 |
| 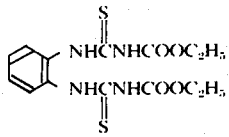 | " | 53.0 | 47.0 |
| Non-treatment | — | 100.0 | — |

Note:
*Commercially available powdery mildew fungicide.

EXAMPLE 17

Cucurbitaceous powdery mildew-controlling effects:

When cucumber seedlings (variety: "KAGAAONAGAFUSINARI"), which had been cultivated in flower pots, had grown to the two leaves stage, they were sprayed with an emulsion of a compound as shown in Table 9 at a concentration as shown in Table 9 in a proportion of 10 ml per pot by means of a spray gun. After the spraying, the pots were allowed to stand in a constant temperature room at 28°C, and after 24 hrs. and 48 hrs., a suspension of spores of cucurbitaceous powdery mildew fungus (*Sphaerotheca fulginea*) was uniformly sprayed thereto to inoculate the fungus. 15 Days after the inoculation, the state of disease of each leaf was investigated in the same manner as in Example 16, and the degree of damage was calculated based thereon, from which the prevent value was calculated. In the present test, four seedlings were used per treatment. The results obtained were as shown in Table 9, from which it is clearly seen that the present compounds are superior to commercially avaliable fungicides, and in addition, the excellent effect of the present compounds is exhibited even at a very low concentration.

EXAMPLE 18

Test for effect of preventing growth of fungus by agar medium dilution method

A compound as shown in Table 10 in the form of an emulsion was incorporated into an agar medium so that the concentration was 50 ppm, and the agar medium was poured onto a petri dish free from any fungi and then solidified, after which a fungus as shown in Table 10 was inoculated thereinto. The petri dish was placed in a constant temperature room at 27°C for a given period of time to culture the fungus, after which the state of growth of the fungus was investigated to obtain the results shown in Table 10, in which the mark "o" means that 95 % or more of the fungus was prevented from growing.

Table 10

| Compound No. | Cm | Gc | Ak | Xo |
|---|---|---|---|---|
| (16) | o | o | | |
| (17) | o | o | o | |
| (18) | o | o | | |
| (19) | o | o | | o |
| (28) | o | o | | |
| (29) | o | o | | |

Table 9

| Compound No. | Active ingredient concentration (ppm) | Degree of damage (%) | Preventive value (%) |
|---|---|---|---|
| (103) | 50 | 0.0 | 100.0 |
| (104) | 50 | 0.0 | 100.0 |
| (105) | 50 | 0.0 | 100.0 |
| (106) | 50 | 0.0 | 100.0 |
| (107) | 50 | 0.0 | 100.0 |
| (108) | 50 | 0.0 | 100.0 |
| (109) | 50 | 3.0 | 97.0 |
| (110) | 50 | 0.0 | 100.0 |
| (111) | 50 | 16.0 | 84.0 |
| (112) | 50 | 0.0 | 100.0 |
| 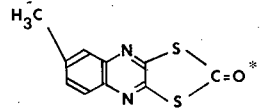 | 50 | 32.0 | 68.0 |
| Non-treatment | — | 100.0 | — |

Note:
*Commercially available powdery mildew fungicide.

Table 10 -Continued

| Compound No. | Cm | Gc | Ak | Xo |
|---|---|---|---|---|
| (30) | o | o | | |
| (31) | o | o | | |
| (32) | o | o | | |
| (33) | o | o | | |
| (44) | | o | | |
| (84) | o | o | | |
| (87) | o | | | |
| (89) | o | o | | o |
| (93) | o | o | | |
| (96) | o | o | | |
| (99) | o | o | | |

Note:
Cm refers to *Cochliobolus miyabeanus*,
Gc refers to *Glomerella cingulata*,
Ak refers to *Alternaria kikuchiana*, and
Xo refers to *Xanthomonas oryzae*.

EXAMPLE 19

Antifungal activity test by agar medium dilution method:

The antifungal activity of the compounds shown in Table 11 against plant disease fungi was investigated by an agar medium dilution method to obtain the results shown in Table 11, in which the numerical values refer to the concentrations at which the fungi were 100 % prevented from growing (unit: ppm.).

Table 11

| Compound No. | Cm | Ak | Gc | Xo |
|---|---|---|---|---|
| (103) | 100 | 500 | <50 | 500 |
| (104) | 100 | 500 | <50 | 500 |
| (105) | 500 | 500 | <50 | <50 |
| (106) | 500 | 500 | <50 | <50 |
| (107) | 500 | 500 | <50 | 500 |
| (108) | 500 | 500 | 50 | 500 |
| (109) | 500 | 500 | <50 | 500 |
| (110) | 500 | 500 | 500 | 500 |
| (111) | 500 | 500 | 500 | 500 |
| (112) | 100 | 500 | <50 | 500 |

Note:
Cm refers to *Cochliobolus miyabeanus*,
Ak refers to *Alternaria kikuchiana*,
Gc refers to *Glomerella cingulata*, and
Xo refers to *Xanthomonas oryzae*.

What is claimed is:

1. A fungicidal composition comprising as the active ingredient a fungicidally effective amount of an imidocarbonate derivative represented by the formula,

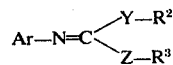

wherein Y and Z, which may be the same or different, are individually an oxygen or sulfur atom; Ar is an unsubstituted or a halogen-or lower $C_1-C_4$ alkyl(straight or branched)-substituted pyridine nucleus, the number of the substituents being 1 to 3;

$R^2$ is a $C_1-C_{18}$ straight alkyl, a $C_1-C_6$ branched alkyl, a $C_1-C_3$ alkyl(straight or branched) having 1 to 2 hydroxy radicals provided that 2 hydroxy groups are not bonded to the same carbon atom or one alkoxy carbonyl(the alkoxy has 1 to 4 carbon atoms) radical in the carbon chain, a cycloalkyl having up to 6 carbon atoms, allyl, propargyl, a benzyl, the benzene nucleus of which may be unsubstituted or substituted by 1 to 4 halogen atoms, 1 to 4 lower $C_1-C_4$ alkyl(straight or branched) radicals or a nitro radical, or a halogen- or lower $C_1-C_4$ alkyl (straight or branched)-substituted phenoxy-$C_1-C_2$ alkyl; and $R^3$ is a $C_1-C_3$ alkyl(straight or branched) having 1 to 2 hydroxy radicals or one alkoxycarbonyl (the alkoxy has 1 to 4 carbon atoms) radical in the carbon chain, allyl, propargyl, or a benzyl, the benzene nucleus of which may be unsubstituted or substituted by 1 to 4 halogen atoms, 1 to 4 lower $C_1-C_4$ alkyl(straight or branched) radicals, a nitro radical or a $C_2-C_4$ alkylene radical and an inert carrier.

2. A method for combatting phytopathogenic fungi on plants comprising applying to said fungi a fungicidally effective amount of the imidocarbonate compound of claim 1.

3. The method of claim 2, wherein said compound is represented by the formula,

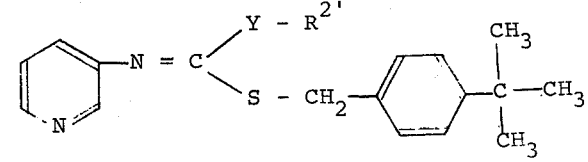

in which Y is oxygen or sulfur, $R^{2'}$ is $C_1-C_8$ alkyl (straight or branched, $C_3-C_6$ cycloalkyl, or lower $C_1-C_4$ alkyl (straight or branched)-substituted benzyl.

4. The method of claim 2, wherein said fungi is powdery mildew.

* * * * *